US011247698B2

(12) United States Patent
Denthumdas et al.

(10) Patent No.: US 11,247,698 B2
(45) Date of Patent: Feb. 15, 2022

(54) METHODS AND SYSTEMS FOR MONITORING REAR OBJECTS IN A VEHICLE

(71) Applicant: Toyota Motor North America, Inc., Plano, TX (US)

(72) Inventors: Shravanthi Denthumdas, Frisco, TX (US); Mathew D. Gardner, Lewisville, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 245 days.

(21) Appl. No.: 16/553,695

(22) Filed: Aug. 28, 2019

(65) Prior Publication Data

US 2021/0061301 A1 Mar. 4, 2021

(51) Int. Cl.
| G06F 7/00 | (2006.01) |
| B60W 50/14 | (2020.01) |
| B60N 2/00 | (2006.01) |
| G08B 21/02 | (2006.01) |
| B60Q 3/16 | (2017.01) |
| G08B 21/18 | (2006.01) |

(52) U.S. Cl.
CPC ............ *B60W 50/14* (2013.01); *B60N 2/002* (2013.01); *B60Q 3/16* (2017.02); *G08B 21/02* (2013.01); *B60Q 2300/23* (2013.01); *B60W 2050/143* (2013.01); *B60W 2050/146* (2013.01); *G08B 21/18* (2013.01)

(58) Field of Classification Search
CPC .......... B60W 50/14; B60W 2050/143; B60W 2050/146; B60W 2420/42; B60W 40/08; G08B 21/02; G08B 21/18; B60Q 3/16; B60Q 2300/23; B60Q 9/00; G06K 9/00832; B60N 2/26; B60N 2/002
USPC ..... 701/36; 340/573.1, 573.4, 457, 438, 576
See application file for complete search history.

(56) References Cited

U.S. PATENT DOCUMENTS

| 7,579,791 | B2 | 8/2009 | Nakashima et al. | |
| 7,909,128 | B1* | 3/2011 | Pontillo | B60K 28/063 |
| | | | | 180/272 |
| 9,630,496 | B2 | 4/2017 | Cuddihy et al. | |
| 9,827,825 | B2 | 11/2017 | Kwark | |
| 2008/0065291 | A1* | 3/2008 | Breed | G06K 9/00355 |
| | | | | 701/36 |
| 2016/0031342 | A1 | 2/2016 | Camello et al. | |
| 2017/0330044 | A1* | 11/2017 | Telpaz | B60K 35/00 |

(Continued)

FOREIGN PATENT DOCUMENTS

CN 107776529 A 3/2018

*Primary Examiner* — Anh V La
(74) *Attorney, Agent, or Firm* — Dinsmore & Shohl LLP (57) ABSTRACT

A system for a vehicle includes one or more processors, one or more memory modules, and machine readable instructions stored in the one or more memory modules. The machine readable instructions, when executed by the one or more processors, cause the system to: receive one or more images from one or more imaging sensors in the vehicle; identify a first object in a rear seat of the vehicle based on the one or more images; identify a second object attached to the first object based on the one or more images; determine whether the second object is in a set of objects; and output an alert in response to determining that the second object is in the set of objects.

20 Claims, 5 Drawing Sheets

(56) References Cited

U.S. PATENT DOCUMENTS

2019/0197326 A1* 6/2019 Ohno ...................... B60R 22/48
2019/0329790 A1* 10/2019 Nandakumar ......... G06N 3/084

* cited by examiner

METHODS AND SYSTEMS FOR MONITORING REAR OBJECTS IN A VEHICLE

TECHNICAL FIELD

The present specification generally relates to vehicle systems for monitoring rear objects in a vehicle and, more specifically, to vehicle systems that detect an object in a rear row seat and output an alert in response to undesirable behavior of the object.

BACKGROUND

A passenger such as a baby, a kid, or an animal may sit in a rear seat of a vehicle. A driver of the vehicle may have difficulty monitoring the passengers in the rear seat while driving. Particularly, the driver of the vehicle may not realize any undesirable behavior of the passenger unless she turns her head and looks at the rear seat or views the rear seat through a rear-view mirror. However, looking backward while driving may interrupt the driving, and the rear-view mirror may only show a limited view of the rear seat. Thus, a system for monitoring a rear seat and generating an alert when undesirable behavior is detected is needed.

SUMMARY

In one embodiment, a system for a vehicle is provided. The system includes one or more processors, one or more memory modules, and machine readable instructions stored in the one or more memory modules that, when executed by the one or more processors, cause the system to: receive one or more images from one or more imaging sensors in the vehicle; identify a first object in a rear seat of the vehicle based on the one or more images; identify a second object attached to the first object based on the one or more images; determine whether the second object is in a set of objects; and output an alert in response to determining that the second object is in the set of objects.

In another embodiment, a vehicle is provided. The vehicle includes one or more front row seats, one or more rear seats, one or more imaging sensors configured to capture one or more images of the one or more rear seats, and a controller. The controller includes one or more processors, one or more memory modules, and machine readable instructions stored in the one or more memory modules that, when executed by the one or more processors, cause the controller to: receive one or more images from the one or more imaging sensors, identify a first object in one of the one or more rear seats based on the one or more images, identify a second object based on the one or more images, determine whether the second object is attached to the first object based on the one or more images, determine whether the second object is in a set of objects, and output an alert in response to determining that the second object is attached to the first object and determining that the second object is in the set of objects.

In another embodiment, a method for providing an alert is provided. The method includes receiving one or more images from one or more imaging sensors in a vehicle, identifying a first object in a rear seat based on the one or more images, identifying a second object based on the one or more images, determining whether the second object is attached to the first object based on the one or more images, determining whether the second object is in a set of objects, and outputting an alert in response to determining that the second object is attached to the first object and determining that the second object is in the set of objects.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
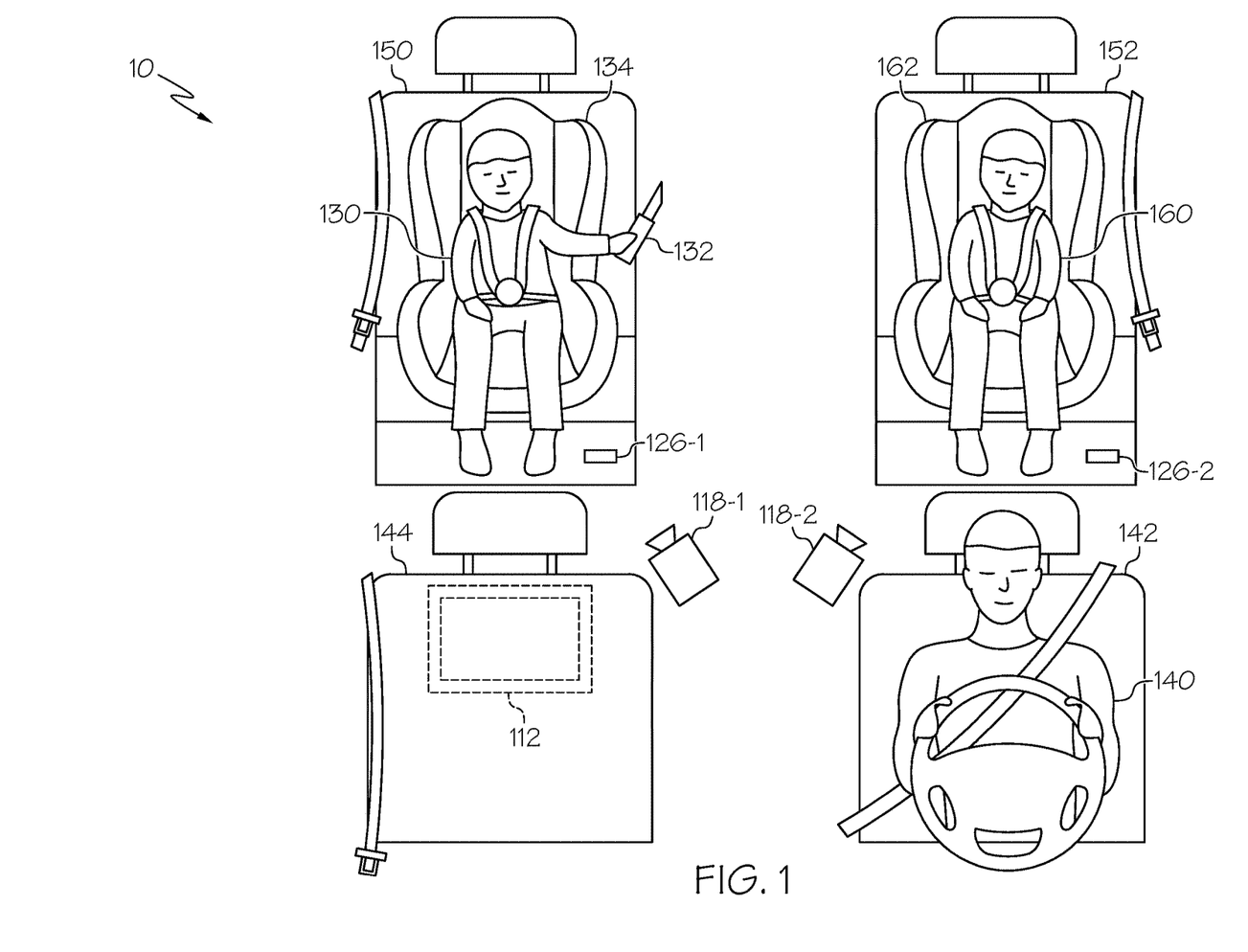
FIG. 1 depicts a vehicle system for monitoring a passenger in a vehicle, according to one or more embodiments shown and described herein.
Figure 3:
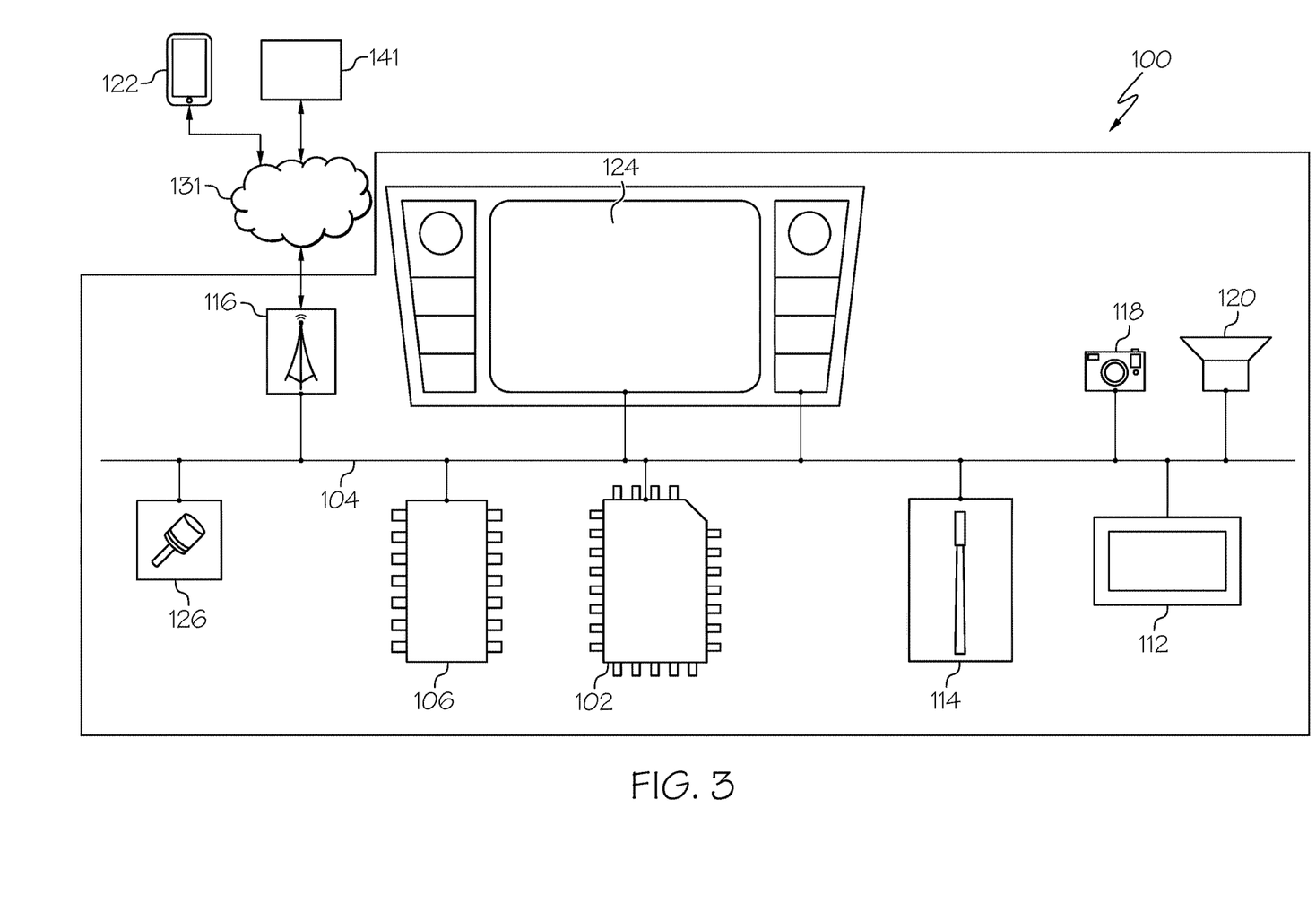
FIG. 3 depicts a schematic illustration of various components of a system for monitoring rear objects in a vehicle, according to one or more embodiments shown and described herein.

The embodiments disclosed herein include vehicle systems that detect an object in a rear row seat and output an alert in response to undesirable behavior of the object. Referring generally to FIGS. 1 and 3, a system for a vehicle includes one or more processors, one or more memory modules, and machine readable instructions stored in the one or more memory modules. The machine readable instructions, when executed by the one or more processors, cause the system to: receive one or more images from one or more imaging sensors in the vehicle; identify a first object in a rear seat of the vehicle based on the one or more images; identify a second object attached to the first object based on the one or more images; determine whether the second object is in a set of objects; and output an alert in response to determining that the second object is in the set of objects. In this regard, a driver of a vehicle may monitor a passenger in a rear seat and recognize a situation when a passenger is holding an undesirable object. The systems, vehicles, and methods described herein may allow a driver to more easily monitor a rear seat and generate an alert when undesirable behavior is detected while reducing the driver's need to monitor the rear seat and/or turn to the rear seat to determine whether such behavior is occurring. Various embodiments of the systems, vehicles, and methods for monitoring rear objects in a vehicle are described in greater detail herein.

FIG. 1 depicts a vehicle system for monitoring a passenger in a vehicle, according to one or more embodiments shown and described herein. In FIG. 1, a driver 140, a passenger 130, and a passenger 160 are in a vehicle 10. The vehicle 10 includes a driver seat 142, a passenger seat 144 and second row seats including a plurality of second row seats 150 and 152. The vehicle 10 may include further seats not shown in FIG. 1, for example, a third row seat, and the like. In embodiments, the second row seats 150 and 152 may include occupant detection sensors 126-1 and 126-2, respectively. The occupant detection sensors 126-1 and 126-2 are included in the one or more occupant detection sensors 126 described below with respect to FIG. 3. While FIG. 1 depicts two second row seats, the vehicle 10 may include more than or less than two second row seats.

In FIG. 1, the driver 140 sits in the driver seat 142, the passenger 130 sits in the second row seat 150, and the passenger 160 sits in the second row seat 152. The occupant detection sensors 126-1 and 126-2 detect the presence of the passengers 130 and 160, respectively. The details of the occupant detection sensors will be described in detail below with reference to FIG. 3. In FIG. 1, the passenger 130 sits in a car seat 134, and the passenger 160 sits in a car seat 162. The passenger 130 holds an object 132. As shown in FIG. 1, the seat 144 in front of the second row seat 150 may include a display 112 facing the passenger 130 such that the passenger 130 may watch content on the display 112. Similarly, the seat 142 in front of the second row seat 152 may include a display (not shown in FIG. 1) facing the passenger 160 such that the passenger 160 may watch content on the display.

In embodiments, two imaging sensors 118-1 and 118-2 (e.g., cameras) are placed within the vehicle 10. The imaging sensors 118-1 and 118-2 are included in the one or more imaging sensors 118 described below with respect to FIG. 3. While FIG. 1 depicts two imaging sensors, the vehicle 10 may include more than or less that two imaging sensors. For example, the vehicle 10 may include one imaging sensor that may capture images of both the second row seats 150 and 152. As another example, the vehicle 10 may include three second row seats and three imaging sensors which capture images of the second row seats, respectively.

In embodiments, the imaging sensor 118-1 may capture images of the passenger 130 and the object 132 that the passenger is holding. Similarly, the imaging sensor 118-2 may capture images of the passenger 160. The imaging sensors 118-1 and 118-2 may capture images when it is determined that the second row seats 150 and 152 are occupied by occupants. For example, when the occupant detection sensor 126-1 detects an occupant in the second row seat 150, the imaging sensor 118-1 starts capturing images of the second row seat 150. When the occupant detection sensor 126-1 no longer detects an occupant in the second row seat 150, the imaging sensor 118-1 stops capturing images of the second row seat 150. In some embodiments, the occupant detection sensor 126-1 measures a weight of an occupant in the second row seat 150. The occupant detection sensor 126-1 may transmit the measured weight to a processor 102 (FIG. 3) of the vehicle 10, and the vehicle 10 may determine whether the measured weight is less than a predetermined weight (e.g., 30 pounds, 40 pounds, or 50 pounds). If it is determined that the weight is less than the predetermined weight, the imaging sensor 118-1 captures images of the second row seat 150. If it is determined that the weight is greater than the predetermined weight, the imaging sensor 118-1 may not capture images of the second row seat 150.

Figure 2:
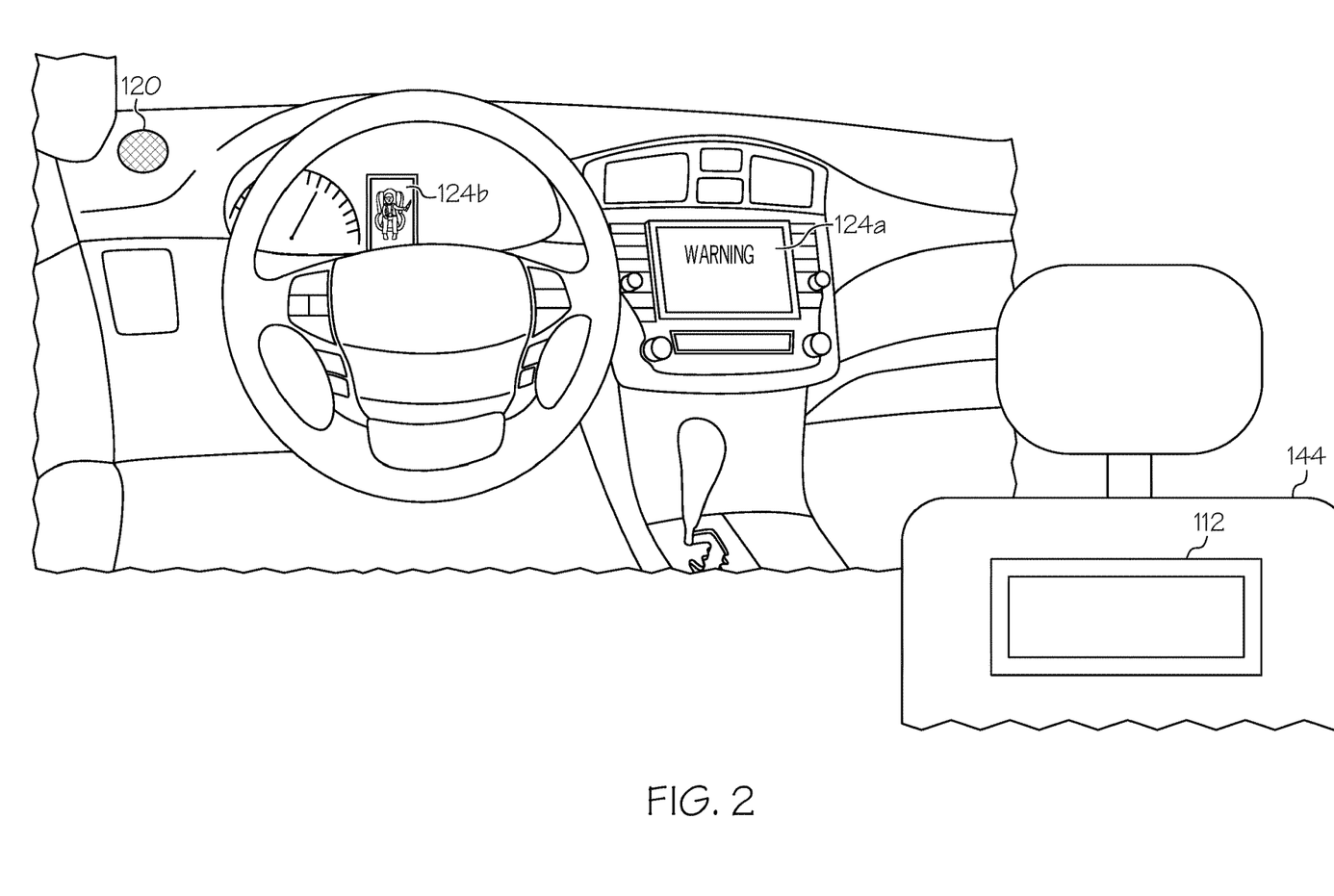
FIG. 2 depicts an interior of a vehicle showing alerts, according to one or more embodiments shown and described herein.

Details of the imaging sensor 118-1 will be described below with reference to FIG. 3. The imaging sensor 118-1 may transmit the captured images to a processor 102 (FIG. 3) of the vehicle. The processor 102 may process the images to identify the passenger 130 and the object 132. If the identified object 132 is one of a set of predetermined items, the processor 102 may instruct output devices to output alerts. In embodiments, the processor 102 may instruct a display 124 (FIG. 3) to display warning messages. For example, as shown in FIG. 2, a warning may be displayed on a console display 124a and/or a dash display 124b (referred to independently and/or collectively herein as "display 124"). The console display 124a may be configured to provide one or more user interfaces and may be configured as a touch screen and/or include other features for receiving user input. The dash display 124b may similarly be configured to provide one or more interfaces, but often the data provided in the dash display 124b is a subset of the data provided by the console display 124a. Regardless, at least a portion of the user interfaces depicted and described herein may be provided on either or both the console display 124a and the dash display 124b. In some embodiments, the processor 102 may instruct the speaker 120 to output an audible alert if the identified object 132 is one of a set of predetermined items.

In some embodiments, the processor 102 may instruct the display 112 to display content if the identified object 132 is one of a set of predetermined items. The processor 102 may retrieve content associated with the identified passenger 130. For example, the content may be frequently viewed by the identified passenger. The processor 102 may record the number of times the content is played while the identified passenger sits in the second row seat 150. If the number of times the content is played while the identified passenger sits in the second row seat 150 is greater than a predetermined value (e.g., 3), the processor 102 may store the content as being frequently viewed by the identified passenger.

As another example, the content for the identified passenger may be predetermined by the driver 140 of the vehicle 10. One more memory modules 106 (FIG. 3) may store content in association with passengers. The content played on the display 112 may distract the passenger 130 from playing with the object 132.

Referring now to FIG. 3, an embodiment of a rear object detection system 100 is schematically depicted. It is noted that, while the rear object detection system 100 is depicted in isolation, the rear object detection system 100 may be included within a vehicle in some embodiments. In embodiments in which the rear object detection system 100 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input. In some embodiments, the system may be embedded within a mobile device (e.g., smartphone, laptop computer, etc.) carried by a driver of the vehicle.

The rear object detection system 100 includes one or more processors 102. Each of the one or more processors 102 may be any device capable of executing machine readable and executable instructions. Accordingly, each of the one or more processors 102 may be a controller, an integrated circuit, a microchip, a computer, or any other computing device. The one or more processors 102 are coupled to a communication path 104 that provides signal interconnectivity between various modules of the system. Accordingly, the communication path 104 may communicatively couple any number of processors 102 with one another, and allow the modules coupled to the communication path 104 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, Near Field Communication (NFC) and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The rear object detection system 100 includes one or more memory modules 106 coupled to the communication path 104. The one or more memory modules 106 may comprise RAM, ROM, flash memories, hard drives, or any device capable of storing machine readable and executable instructions such that the machine readable and executable instructions can be accessed by the one or more processors 102. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 106. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the one or more memory modules 106 may include a database that includes information on a plurality of displays in a vehicle. For example, the database may include locations of the plurality of displays, sizes of the plurality of the displays, functionalities supported by the plurality of displays such as Bluetooth® functionality.

Referring still to FIG. 3, the rear object detection system 100 comprises the display 124 for providing visual output such as, for example, maps, navigation, entertainment, data received from an external device, or a combination thereof. The display 124 may output one of an alert message, map, navigation, entertainment, and data received from an external device in response to a selection of corresponding function. The display 124 may be coupled to the communication path 104. Accordingly, the communication path 104 communicatively couples the display 124 to other modules of the rear object detection system 100. The display 124 may include any medium capable of transmitting an optical output such as, for example, a cathode ray tube, light emitting diodes, a liquid crystal display, a plasma display, or the like. Moreover, the display 124 may be a touchscreen that, in addition to providing optical information, detects the presence and location of a tactile input upon a surface of or adjacent to the display. Accordingly, the display may receive mechanical input directly upon the optical output provided by the display. In some embodiments, the rear object detection system 100 comprises one or more displays 112. The one or more displays 112 may be located at the back of the driver seat 142 and/or the passenger seat 144, as shown in FIG. 1, such that an occupant behind the driver seat 142 and/or the passenger seat 144 may watch the screen. The one or more displays 112 may provide visual output such as, for example, maps, navigation, entertainment, data received from an external device, or a combination thereof.

The rear object detection system 100 comprises a satellite antenna 114 coupled to the communication path 104 such that the communication path 104 communicatively couples the satellite antenna 114 to other modules of the rear object detection system 100. The satellite antenna 114 is configured to receive signals from global positioning system satellites. Specifically, in one embodiment, the satellite antenna 114 includes one or more conductive elements that interact with electromagnetic signals transmitted by global positioning system satellites. The received signal is transformed into a data signal indicative of the location (e.g., latitude and longitude) of the satellite antenna 114 or an object positioned near the satellite antenna 114, by the one or more processors 102. Additionally, it is noted that the satellite antenna 114 may include at least one of the one or more processors 102 and the one or memory modules 106. In some embodiments, the rear object detection system 100 does not include the satellite antenna 114.

Still referring to FIG. 3, in some embodiments, the rear object detection system 100 may be communicatively coupled to a server 141 (e.g., a social media network server) by a network 131. In one embodiment, the network 131 may include one or more computer networks (e.g., a personal area network, a local area network, or a wide area network), cellular networks, satellite networks and/or a global positioning system and combinations thereof. Accordingly, the rear object detection system 100 can be communicatively coupled to the network 131 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable cellular networks include, but are not limited to, technologies such as LTE, WiMAX, UMTS, CDMA, and GSM. The rear object detection system 100 may send an alert along with the current location of the vehicle to the server 141 when the identified object 132 is one of predetermined objects. For example, the rear object detection system 100 may send a picture of the passenger 130 holding the object 132 to the server 141 in response to determination that the identified object 132 is one of predetermined objects.

Still referring to FIG. 3, the rear object detection system 100 comprises network interface hardware 116 for communicatively coupling the rear object detection system 100 to the server 141. The network interface hardware 116 can be communicatively coupled to the communication path 104 and can be any device capable of transmitting and/or receiving data via a network. Accordingly, the network interface hardware 116 can include a communication transceiver for sending and/or receiving any wired or wireless communication. For example, the network interface hardware 116 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 116 includes hardware configured to operate in accordance with the Bluetooth wireless communication protocol. Some embodiments may not include the network interface hardware 116.

Still referring to FIG. 3, the rear object detection system 100 may further comprise one or more imaging sensors 118. Each of the one or more imaging sensors 118 is coupled to the communication path 104 and communicatively coupled to the one or more processors 102. Each of the one or more imaging sensors 118 may be any device having an array of sensing devices (e.g., pixels) capable of detecting radiation in an ultraviolet wavelength band, a visible light wavelength band, or an infrared wavelength band. Each of the one or more imaging sensors 118 may have any resolution. The one or more imaging sensors 118 may include an omni-directional camera, or a panoramic camera. In some embodiments, one or more optical components, such as a mirror, fish-eye lens, or any other type of lens may be optically coupled to at least one of the one or more imaging sensors 118. The one or more imaging sensors 118 may be located in a vehicle to capture a view of a passenger in the vehicle, for example, as shown in FIG. 1. The one or more imaging sensors 118 may transmit the captured images to the one or more processors 102 via the communication path 104.

The rear object detection system 100 may further comprise a speaker 120 coupled to the communication path 104 such that the communication path 104 communicatively couples the speaker 120 to other modules of the rear object detection system 100. The speaker 120 transforms data signals from the rear object detection system 100 into audible mechanical vibrations. The speaker 120 may play audio streaming from an external device, such as a smartphone.

Still referring to FIG. 3, the rear object detection system 100 may be coupled to a portable device 122. For example, the rear object detection system 100 may be communicatively coupled to the portable device 122 via the network 131. As described above, the network 131 may include one or more computer networks (e.g., a personal area network, a local area network, or a wide area network), cellular networks, satellite networks and/or a global positioning system and combinations thereof. In some embodiments, the portable device 122 is coupled to the communication path 104 such that the communication path 104 communicatively couples the portable device 122 to other modules of the rear object detection system 100. The portable device 122 may include, without limitation, a smartphone, a tablet, a personal media player, or any other electric device that includes wireless communication functionality. The rear object detection system 100 may send an alert to the portable device 122 in a certain situation when it is determined that there is a passenger seating in a second-row seat holding a certain object. For example, the rear object detection system 100 may send a picture of the passenger 130 holding the object 132 to the server 141 in response to determination that the identified object 132 is one of predetermined objects.

Still referring to FIG. 3, the rear object detection system 100 may further comprise one or more occupant detection sensors 126. The one or more occupant detection sensors 126 is coupled to the communication path 104 such that the communication path 104 communicatively couples the one or more occupant detection sensors 126 to other modules of the rear object detection system 100. The one or more occupant detection sensors 126 may include a proximity sensor. The proximate sensor detects a distance between the proximity sensor and an object nearby and communicates the proximity information to the electronic control unit of the vehicle. The proximity sensor may be any device capable of outputting a proximity signal indicative of a proximity of an object to the proximity sensor. In some embodiments, the proximity sensor may include a laser scanner, a capacitive displacement sensor, a Doppler effect sensor, an eddy-current sensor, an ultrasonic sensor, a magnetic sensor, an optical sensor, a radar sensor, a sonar sensor, or the like. Some embodiments may not include the proximity sensor. In some embodiments, the rear object detection system 100 may be configured to determine the presence of an object in a seat of a vehicle based on an output signal outputted by the proximity sensor.

In some embodiments, the rear object detection system 100 may be able to determine one or more characteristics of an object on the seat, such as, for example, the dimensions of the object (height, width, diameter, or the like) based on a proximity signal outputted by the one or more occupant detection sensors 126. In other embodiments, the one or more occupant detection sensors 126 may include a weight sensor. The weight sensor may be integrated into a vehicle seat, and measure a weight of an occupant in the seat.

Still referring to FIG. 1, the rear object detection system 100 can be formed from a plurality of modular units, i.e., the display 124, the display 112, the speaker 120, the portable device 122, and the one or more imaging sensors 118, can be formed as modules communicatively coupled form the rear object detection system 100. Accordingly, in some embodiments, each of the modules can include at least one of the one or more processors 102 and/or the one or more memory modules 106. Accordingly, it is noted that, while specific modules may be described herein as including a processor 102 and/or a memory module 106, the embodiments described herein can be implemented with the processors 102 and memory modules 106 distributed throughout various communicatively coupled modules.

Figure 4:
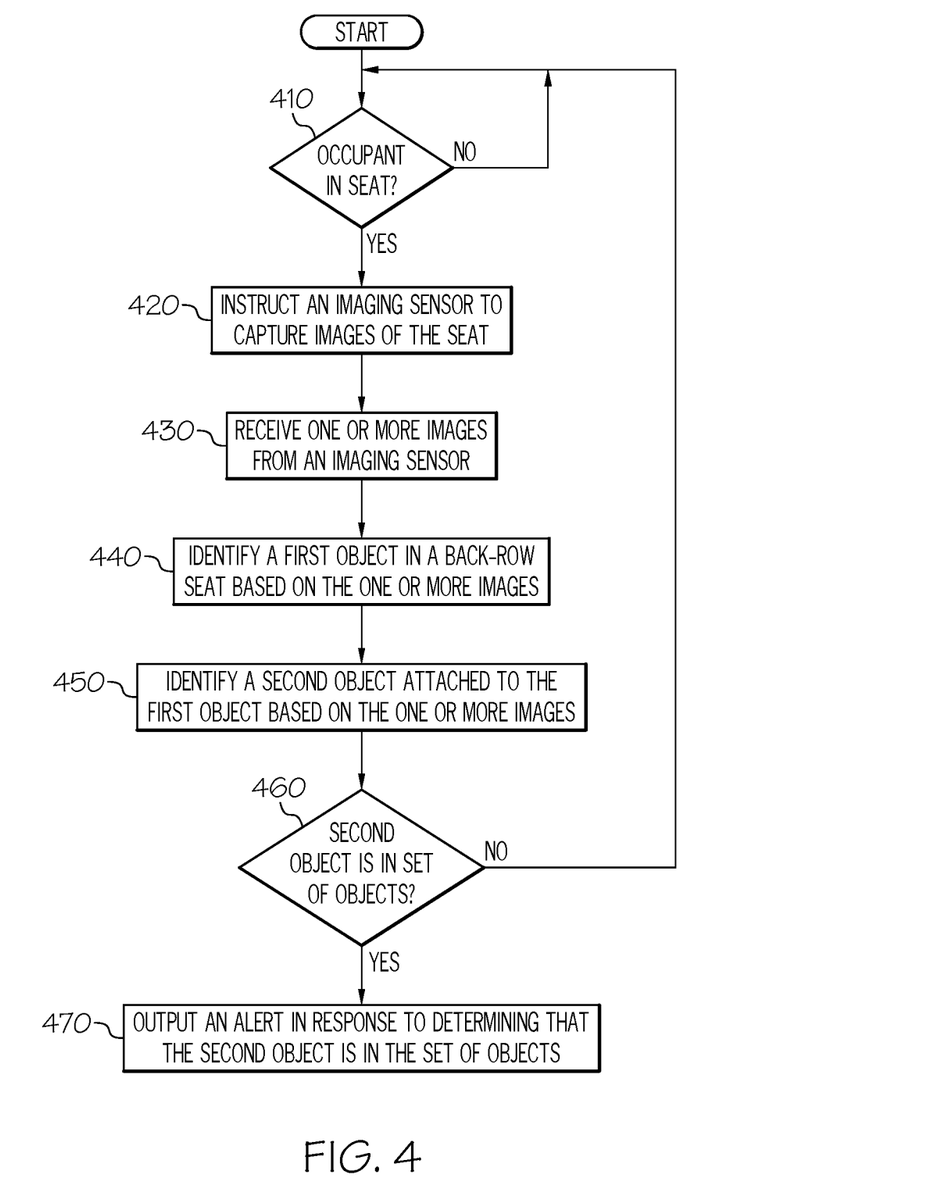
FIG. 4 depicts a flowchart of monitoring rear objects in a vehicle and generating alerts, according to one or more embodiments shown and described herein.

FIG. 4 depicts a flowchart for monitoring a rear object and outputting an alert in response to detecting an undesirable event, according to one or more embodiments shown and described herein.

In block 410, the rear object detection system 100 determines whether an occupant is in a seat. In embodiments, the rear object detection system 100 may determine whether an occupant is in a seat of a vehicle based on signals from an occupant detection sensor. For example, referring to FIG. 1, the rear object detection system 100 may determine that the second row seats 150 and 152 are occupied by objects based on signals from the occupant detection sensors 126-1 and 126-2. If it is determined that the seat is occupied, then the process proceeds to block 420. If it is not determined that the seat is occupied, the process repeats block 410 until it determines that the seat is occupied.

In block 420, the rear object detection system 100 instructs the imaging sensor 118 to capture images of the occupied seat. For example, referring to FIG. 1, if the rear object detection system 100 determines that the second row seat 150 is occupied, the rear object detection system 100 instructs the imaging sensor 118-1 to capture images of the second row seat 150. Similarly, if the rear object detection system 100 determines that the second row seat 152 is occupied, the rear object detection system 100 instructs the imaging sensor 118-2 to capture images of the second row seat 152. In some embodiments, the vehicle 10 includes a single imaging sensor 118 that may be rotatable. If the rear object detection system 100 determines that the second row seat 150 is occupied, the imaging sensor 118 is rotated to face and capture the second row seat 150.

In block 430, the rear object detection system 100 receives one or more images from the imaging sensor. In embodiments, the imaging sensor 118 captures image data and communicates the image data to the one or more processors 102 and/or to other systems communicatively coupled to the communication path 104.

In block 440, the rear object detection system 100 identifies a first object in a second seat of a vehicle based on the one or more images. In embodiments, the one or more processors 102 may process the image data using one or more image processing algorithms. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms. In this example, the one or more processors 102 process the image data to identify the passenger 130 in the second row seat 150 of the vehicle 10 as shown in FIG. 1.

In block 450, the rear object detection system 100 identifies a second object attached to the first object based on the one or more images. In embodiments, the one or more processors 102 may process the image data using one or more image processing algorithms to identify the second object. In this example, the one or more processors 102 process the image data to identify the object 132 attached to the passenger 130. In some embodiments, the one or more processors 102 may process the image data using one or more image processing algorithms to identify one or more hands of the passenger 130, and identify an object attached to one or more hands of the passenger 130. The one or more processors 102 may determine that the second object is attached to the first object if it is determined that a part of the first object is integrally moved with the second object based on a series of captured images. In some embodiments, the one or more processors 102 may process the image data using one or more image processing algorithms to identify a mouth of the passenger 130, and identify an object attached to the mouth of the passenger 130. The one or more processors 102 may determine that the second object is attached to the first object if it is determined that the mouth of the first object is integrally moved with the second object based on a series of captured images.

In block 460, the rear object detection system 100 determines whether the second object is in a set of objects. In embodiments, the one or more processors 102 determine whether the second object identified in block 430 corresponds to one of the set of objects. The set of objects may include objects that are not desirable for the passenger to hold. For example, the set of objects may include a sharp object, such as a knife, a pen, a fork, a screw driver, etc. The set of objects may be pre-stored by a user. For example, a user may input a list of objects into the rear object detection system 100 using the portable device 122, or touching on the display 124. The set of objects may be dynamically updated.

In embodiments, the processor 102 may retrieve a list of a set of objects from the one or more memory modules 106. The processor 102 may retrieve a list of set of objects associated with characteristics of an occupant. For example, the one or more memory modules 106 may store a set of objects in association with an identification of an occupant shown in Table 1 below.

TABLE 1

| User | A set objects |
| --- | --- |
| Occupant A | a knife, a pen, a fork, a screw driver, a seat belt, a plastic bag, a string, a scissor |
| Occupant B | a knife, a screw driver, a scissor |
| Occupant C | a knife |

In this example, referring to FIG. 1, the rear object detection system 100 may identify the passenger 130 as an occupant A. Then the processor 102 retrieves a set of objects including a knife, a pen, a fork, a screw driver, a seat belt, a plastic bag, a string, and a scissor from the one or more memory modules 106 based on Table 1.

As another example, the one or more memory modules 106 may store a set of objects in association with a physical quantity of an occupant as shown in Table 2 below.

TABLE 2

| User | A set objects |
| --- | --- |
| Occupants less than 40 pounds | a knife, a pen, a fork, a screw driver, a seat belt, a plastic bag, a string, a scissor |
| Occupants between 40 pounds and 80 pounds | a knife, a screw driver, a scissor |
| Occupants over 80 pounds | a knife |

In this example, by referring to FIG. 1, the rear object detection system 100 may measure a weight of the passenger 160 using the occupant detection sensor 126-2. The measured weight may be 50 pounds. Then, the processor 102 retrieves a set of objects including a knife, a screw driver, and a scissor from the one or more memory modules 106.

If it is determined that the second object is in the set of objects in block 460, the rear object detection system 100 outputs an alert in block 470. In embodiments, in response to determining that the second object is in the set of objects, the one or more processors 102 may instruct an output device to output an alert. For example, the one or more processors 102 may instruct the display 124 to display the captured image and video such that a driver of the vehicle may see the passenger 130 holding the object 132. As another example, in response to determining that the second object is in the set of objects, the one or more processors 102 may instruct the speaker 120 to output an audible alert. In some embodiments, in response to determining that the second object is in the set of objects, the one or more processors 102 may transmit an alert to the portable device 122.

If it is determined that the second object is not in the set of objects in block 460, the rear object detection system 100 outputs an alert in block 470, the process returns to block 410.

Figure 5:
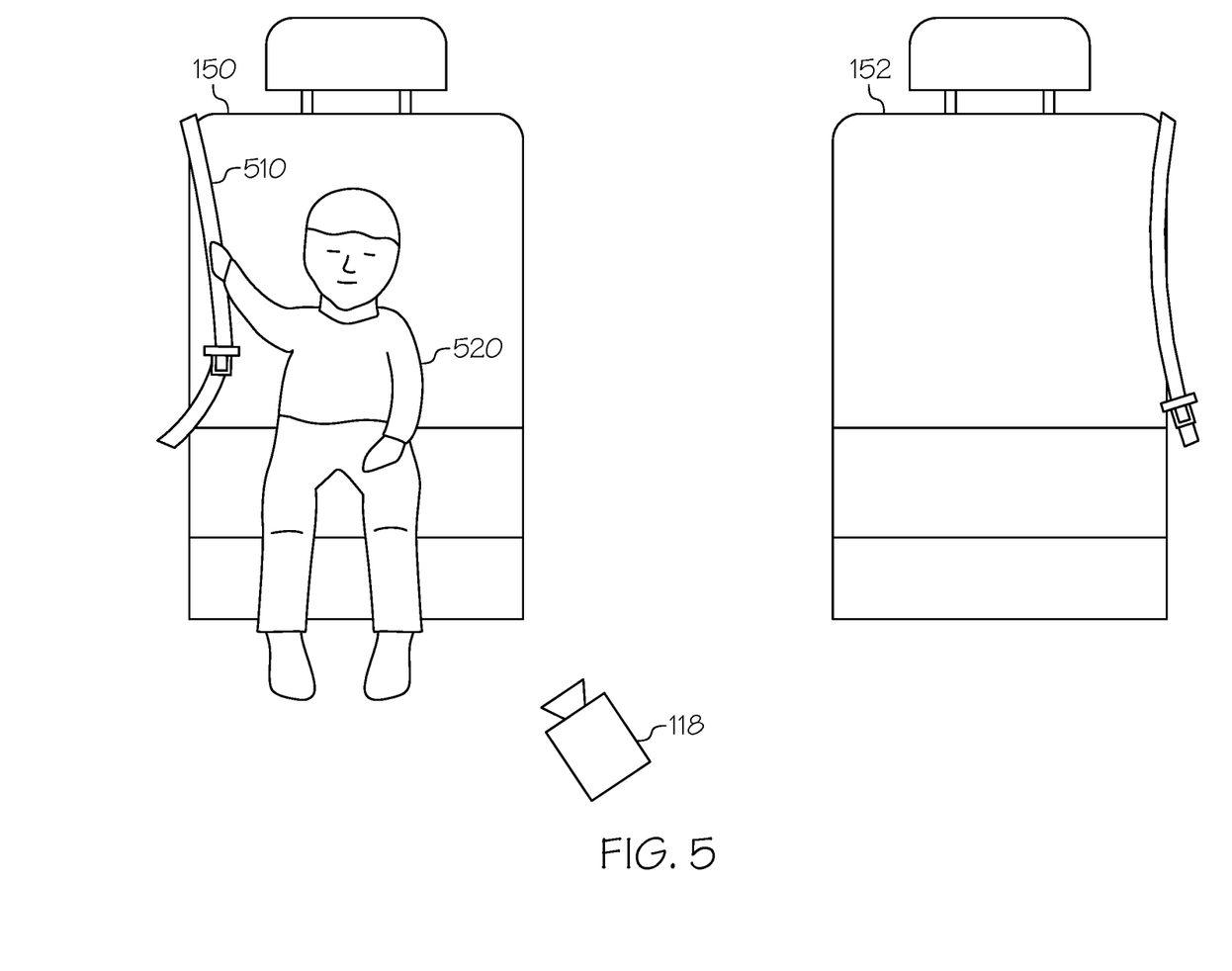
FIG. 5 depicts monitoring a passenger in a rear seat holding a seat belt, according to one or more embodiments shown and described herein.

FIG. 5 depicts monitoring a passenger in a rear seat holding a seat belt, according to one or more embodiments shown and described herein. In this example, the imaging sensor 118 captures images of the passenger 520 holding the seatbelt 510. The one or more processors 102 may determine that the seatbelt 510 is attached to the passenger 520 if it is determined that a part of the passenger 520 (e.g., a hand) is integrally moved with the seatbelt 510 based on a series of the captured images. The rear object detection system 100 determines whether the seatbelt 510 is in a set of objects. By referring to Table 1 above, if the passenger is identified as Occupant A, then the set of objects for the passenger includes a seatbelt. Then, the rear object detection system 100 outputs an alert. If the passenger is identified as Occupant B, then the set of objects for the passenger does not include a seatbelt. Then, the rear object detection system 100 does not output an alert. As another example, by referring to Table 2 above, if the weight of the passenger is less than 40 pounds, the set of objects for the passenger includes a seatbelt. Then, the rear object detection system 100 outputs an alert. If the weight of the passenger is over 40 pounds, the set of objects for the passenger does not include a seatbelt. Then, the rear object detection system 100 does not output an alert.

It should be understood that embodiments described herein are directed to systems for monitoring rear object in a vehicle. The system for a vehicle includes one or more processors, one or more memory modules, and machine readable instructions stored in the one or more memory modules. The machine readable instructions, when executed by the one or more processors, cause the system to: receive one or more images from one or more imaging sensors in the vehicle; identify a first object in a rear seat of the vehicle based on the one or more images; identify a second object attached to the first object based on the one or more images; determine whether the second object is in a set of objects; and output an alert in response to determining that the second object is in the set of objects. In this regard, a driver of a vehicle may monitor a passenger in a rear seat and recognize a situation when a passenger is holding an undesirable object without looking backward while driving. The system automatically monitors rear objects and outputs an alert such that a driver of the vehicle may notice undesirable behaviors of the rear objects.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for a vehicle, the system comprising:
 a display proximate to a rear seat of the vehicle; and
 a controller programmed to:
  receive one or more images from one or more imaging sensors in the vehicle;
  identify a first object in the rear seat of the vehicle based on the one or more images;
  identify a second object attached to the first object based on the one or more images;
  determine whether the second object is in a set of objects;
  output an alert in response to determining that the second object is in the set of objects; and
  present content, on the display, that is frequently viewed by the first object in response to the identifying of the second object being attached to the first object and determining that the second object is in the set of objects.

2. The system of claim 1, wherein the controller programmed to:
 determine one or more characteristics of the first object; and
 determine the set of objects based on the one or more characteristics of the first object.

3. The system of claim 2, wherein the one or more characteristics of the first object include identification of the first object; and
 the controller programmed to determine the identification of the first object based on the one or more imaging sensors.

4. The system of claim 2, further comprising one or more occupant detection sensors, wherein:
 the one or more characteristics of the first object include a weight of the first object; and
 the controller programmed to receive the weight of the first object from the one or more occupant detection sensors.

5. The system of claim 1, wherein the set of objects include at least one of a knife, a pen, a fork, a screw driver, a seat belt, a plastic bag, a string, or a scissor.

6. The system of claim 1, further comprising one or more occupant detection sensors,
 wherein the controller programmed to:
  determine whether the rear seat is occupied by the first object based on data from the one or more occupant detection sensors; and
  instruct the one or more imaging sensors to capture the one or more images in response to determining that the rear seat is occupied by the first object.

7. The system of claim 1, wherein the content is associated with the first object based on a history of one or more views of the content by the first object.

8. The system of claim 1, wherein the controller programmed to:
 identify a portion of the first object based on the one or more images;
 determine whether the portion moves integrally with the second object based on the one or more images; and
 determine that the second object is attached to the first object in response to determination that the portion moves integrally with the second object.

9. A method for providing an alert, the method comprising:
 receiving one or more images from one or more imaging sensors in a vehicle;
 identifying a first object in a rear seat based on the one or more images;
 identifying a second object based on the one or more images;
 determining whether the second object is attached to the first object based on the one or more images;

determining whether the second object is in a set of objects;

outputting the alert in response to determining that the second object is attached to the first object and determining that the second object is in the set of objects; and presenting, on a display, content that is frequently viewed by the first object in response to the identifying of the second object being attached to the first object and determining that the second object is in the set of objects.

10. A vehicle comprising:

one or more front row seats;

one or more rear seats;

a display proximate to the one or more rear seats;

one or more imaging sensors configured to capture one or more images of the one or more rear seats; and a controller programmed to:
   receive the one or more images from the one or more imaging sensors;
   identify a first object in one of the one or more rear seats based on the one or more images;
   identify a second object based on the one or more images;
   determine whether the second object is attached to the first object based on the one or more images;
   determine whether the second object is in a set of objects;
   output an alert in response to determining that the second object is attached to the first object and determining that the second object is in the set of objects; and
   present content, on the display, that is frequently viewed by the first object in response to the identifying of the second object being attached to the first object and determining that the second object is in the set of objects.

11. The vehicle of claim 10, wherein the controller programmed to:

determine one or more characteristics of the first object; and determine the set of objects based on the one or more characteristics of the first object.

12. The vehicle of claim 11, wherein the one or more characteristics of the first object include identification of the first object; and the controller programmed to determine the identification of the first object based on the one or more imaging sensors.

13. The vehicle of claim 11, further comprising one or more occupant detection sensors, wherein:

the one or more characteristics of the first object include a weight of the first object; and the controller programmed to receive the weight of the first object from the one or more occupant detection sensors.

14. The vehicle of claim 10, wherein the content is associated with the first object based on a history of one or more views of the content by the first object.

15. The vehicle of claim 10, wherein the controller programmed to:

identify a portion of the first object based on the one or more images;

determine whether the portion moves integrally with the second object based on the one or more images; and determine that the second object is attached to the first object in response to determination that the portion moves integrally with the second object.

16. The method of claim 9, further comprising presenting, on an additional display that is proximate to one or more front row seats of the vehicle, an image from the one or more images that include the first object being attached to the second object, the presenting is responsive to determining that the second object is attached to the first object.

17. The method of claim 16, further comprising:

determining one or more characteristics of the first object; and determining the set of objects based on the one or more characteristics of the first object.

18. The method of claim 16, wherein the content is associated with the first object based on a history of one or more views of the content by the first object.

19. The system of claim 1, wherein the controller programmed to:

record a number of times that the content is played when the first object is located in the rear seat;

compare the number of times that the content is played with a value; and identify the content as being frequently viewed by the first object responsive to the number of times that the content is played exceeding the value.

20. The method of claim 9, further comprising:

recording a number of times that the content is played when the first object is located in the rear seat; and comparing the number of times that the content is played with a value; and identifying the content as being frequently viewed by the first object responsive to the number of times that the content is played exceeding the value.

* * * * *